US005563953A

United States Patent [19]

Kwon

[11] Patent Number: 5,563,953

[45] Date of Patent: Oct. 8, 1996

[54] APPARATUS AND METHOD FOR EVALUATING AUDIO DISTORTING

[75] Inventor: Soon-Keon Kwon, Seoul, Rep. of Korea

[73] Assignee: Daewoo Electronics Co., Ltd., Seoul, Rep. of Korea

[21] Appl. No.: 295,953

[22] Filed: Aug. 25, 1994

[30] Foreign Application Priority Data

Aug. 25, 1993 [KR] Rep. of Korea .................. 1993-16554

[51] Int. Cl.$^6$ .................................................... H04B 15/00

[52] U.S. Cl. ................................................ 381/58; 381/94

[58] Field of Search .................................... 381/58, 94, 2

[56] References Cited

U.S. PATENT DOCUMENTS

| | | | |
|---|---|---|---|
| 4,706,290 | 11/1987 | Lin | 381/58 |
| 5,402,495 | 3/1995 | Kim | 381/94 |

FOREIGN PATENT DOCUMENTS

WO-A-89 08357 9/1989 WIPO .

OTHER PUBLICATIONS

K. Brandenburg et al. "'NMR" and Masking Flag: Evaluation of Quality Using Perceptual Criteria', Proc. AES 11th Int. Conf., pp. 169–179, May 1992.

T. Thiede et al. "Mode of operation and features of methods for the auditorily correct evaluation of audio signals with reduced bit rates" Rundfunktechnische Mitteilungen, vol. 38, pp. 102–114, Jun. 1994.

P. Noll "Wideband Speech and Audio Coding" IEEE Communications Magazine, vol. 31, pp. 34–44, Nov. 1993.

*Primary Examiner*—Stephen Brinich
*Attorney, Agent, or Firm*—Anderson, Kill & Olick P.C.

[57] ABSTRACT

An improved apparatus and method utilizes both frequency and time masking effects to evaluate an audio distortions so that the results obtained thereby have a best match with actual human auditory perception. A power density spectrum is first estimated for an input digital audio signal and a frequency masking threshold is determined based on the power density spectrum for the input digital audio signal. In the meantime, a power density spectrum is estimated for a difference signal, wherein the difference signal represents the difference between the input digital audio signal and an output digital signal. A perceptual spectrum distance is then determined based on the power density spectrum of the difference signal and the frequency masking threshold. Finally, the audio distortion between the input digital audio signal and the output digital audio signal is estimated by multiplying the estimated perceptual spectrum distance with a weight factor calculated by using the power density spectrums of a current frame and its at least one previous frame of the input digital audio signal.

14 Claims, 2 Drawing Sheets

APPARATUS AND METHOD FOR EVALUATING AUDIO DISTORTING

FIELD OF THE INVENTION

The present invention relates to an apparatus and method for evaluating an audio distortion in an audio system; and, more particularly, to an improved apparatus and method for providing an evaluation of an audio distortion consistent with actual human auditory perception by using both frequency and time masking effects.

DESCRIPTION OF THE PRIOR ART

An audio distortion measuring device is normally used to evaluate the performance of an audio system: for the performance or quality of an audio system is generally measured based on the level of "distortions". The audio distortions are usually measured in terms of "Total Harmonic Distortion (THD)" and "Signal to Noise Ratios (SNR)", wherein said THD is a RMS (root-mean-square) sum of all the individual harmonic-distortion components and/or IMD's (Intermodulation Distortions) which consist of sum and difference products generated when two or more signals pass through an audio system; and said SNR represents the ratio, in decibels, between the amplitude of an input signal and the amplitude of an error signal.

However, such THD or SNR measurement is a physical value which has no direct bearing on the human auditory faculty or perception. As a result, a listener may feel that a sound produced by an audio system having a greater THD (or less SNR) is less distorted than the one produced by a system having a lower THD (or greater SNR).

Consequently, various techniques or devices for realistically evaluating audio distortions have been proposed. One of such devices is disclosed in U.S. Pat. No. 4,706,290, which comprises a primary and a secondary networks for the measurement of loudspeaker subharmonics so that the results obtained will approximate the human auditory perception.

However, as this apparatus serves to measure weighted harmonic distortions in the time domain, the results do not best reflect how the human auditory faculty actually functions. Further, the apparatus has to employ various analog circuitries, rendering it rather difficult to precisely adjust the circuit parameters up to a desired level in, e.g., a high fidelity stereo system.

Other types of devices contemplated for use in evaluating audio distortions include a device disclosed in a copending, commonly assigned application Ser. No. 08/133,662, now U.S. Pat. No. 5,402,495, entitled "METHOD AND APPARATUS FOR EVALUATING AUDIO DISTORTION". This apparatus determines an audio distortion in an audio system by estimating a perceptual spectrum distance based on the power density spectrum of a difference signal which exceeds the frequency masking threshold. The frequency masking threshold represents an audible limit which is a sum of the intrinsic audible limit or threshold of a sound and an increment caused by the presence of another (masking) contemporary sound in the frequency domain. The algorithm for determining the frequency masking threshold is described in detail, for example, in an article entitled "Coding of Moving Pictures and Associated Audio for Digital Storage Media at up to about 1.5 Mbit/s, Part 3 Audio" which is also known as the so-called "MPEG (Moving Pictures Expert Group)-I" submitted to ISOIEC/JTCI SC29 on 22 Nov. 1991.

Since, however, the above apparatus fails to take into account the time masking effect in determining an audio signal, it has a limited ability to measure the audio distortions consistent with the actual human auditory perception.

SUMMARY OF THE INVENTION

It is, therefore, a primary object of the invention to provide an improved apparatus and method for evaluating an audio distortion by considering both the frequency and the time masking effects of the audio distortion so that the results obtained thereby have a realistic correspondence to the actual human auditory perception.

As used herein, the term "time masking effect" represents a phenomenon wherein the audible limit or threshold of audibility for a sound is raised due to the presence of another temporally adjacent sound in the time domain; whereas the term "frequency masking effect" means an increase in the audible limit or threshold of audibility for a sound caused by the presence of another (i.e., masking) contemporary sound in the frequency domain.

In accordance with one aspect of the invention, there is provided an apparatus for use in an audio system for evaluating an audio distortion, on a frame-by-frame basis, arising between an input digital audio signal to the audio system and an output digital audio signal from the audio system wherein said input and output digital audio signals include a plurality of frames, respectively, which comprises: first estimation means for estimating a power density spectrum for a current frame of the input digital audio signal; means for determining a frequency masking threshold based on the power density spectrum for the current frame of the input digital audio signal; second estimation means for estimating a power density spectrum of a difference signal representing the difference between the current frame of the input digital audio signal and its corresponding frame of the output digital audio signal; third estimation means for estimating a perceptual spectrum distance based on the power density spectrum of the difference signal and the frequency masking threshold; and fourth estimation means for estimating the audio distortion between the current frame of the input digital audio signal and its corresponding frame of the output digital audio signal by multiplying the estimated perceptual spectrum distance with a weight factor calculated by using the power density spectrums of the current frame and its at least one previous frame of the input digital audio signal.

In accordance with another aspect of the invention, there is provided a method for use in an audio system for evaluating an audio distortion, on a frame-by-frame basis, arising between an input digital audio signal to the audio system and an output digital audio signal from the audio system wherein said input and output digital audio signals include a plurality of frames, respectively, comprising the steps of: estimating a power density spectrum for a current frame of the input digital audio signal; determining a frequency masking threshold based on the power density spectrum for the current frame of the input digital audio signal; estimating a power density spectrum of a difference signal representing the difference between the current frame of the input digital audio signal and its corresponding frame of the output digital audio signal; estimating a perceptual spectrum distance based on the power density spectrum of the difference signal and the frequency masking threshold; and estimating the audio distortion between the current frame of the input digital audio signal and its corresponding frame of the output digital audio signal by multiplying the estimated perceptual spectrum distance with a weight factor calculated by using the power density spectrums of the current frame and its at least one previous frame of the input digital audio signal.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
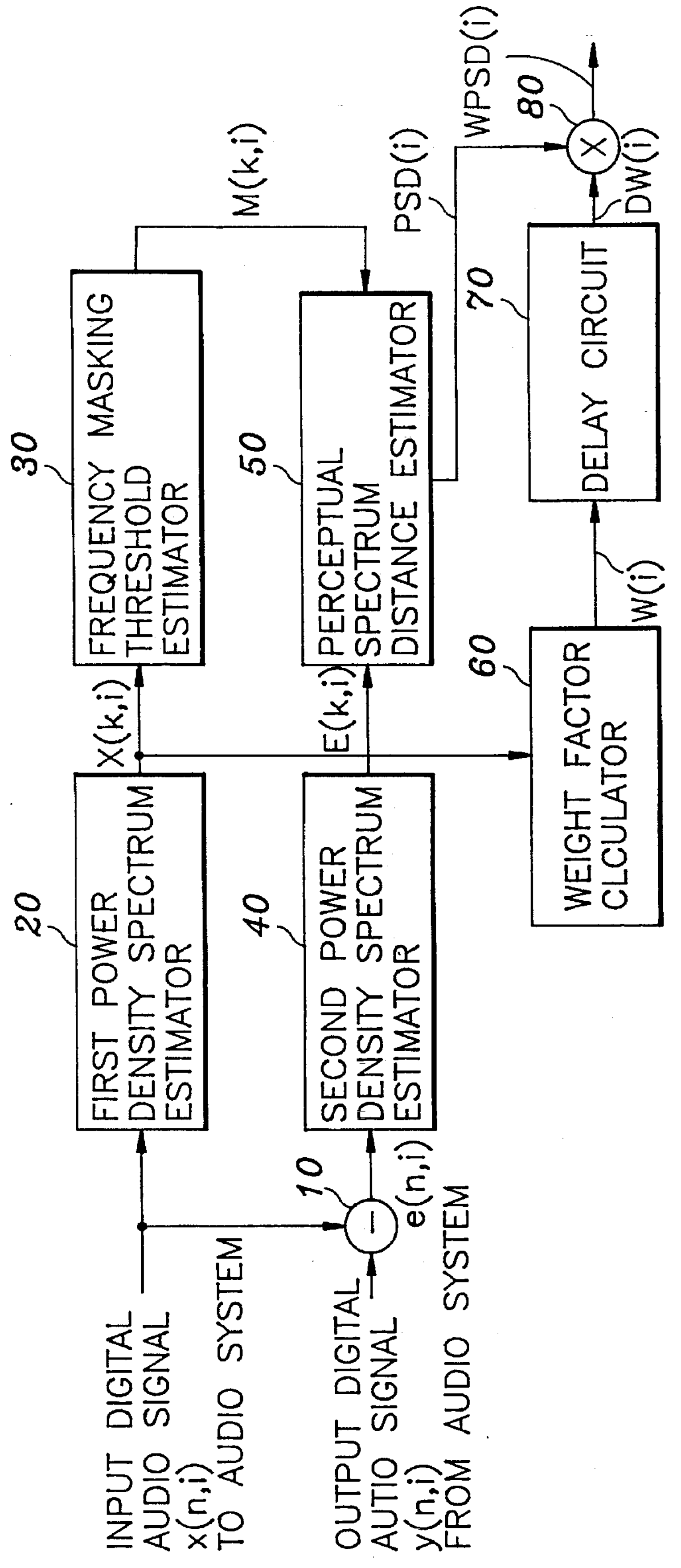
FIG. 1 is a schematic block diagram showing a novel apparatus for evaluating audio distortions in accordance with the present invention.

Referring to FIG. 1, the inventive apparatus includes a first and a second power density spectrum estimators 20 and 40, a frequency masking threshold estimator 30, a perceptual spectrum distance estimator 50, a weight factor calculator 60, a delay circuit 70 and a multiplier 80.

An input digital audio signal x(n,i) of an ith frame, or a current frame, to an audio system (not shown), which includes N samples, i.e., n=0, 1, 2, . . . N−1, is sequentially applied to a subtractor 10, and the first power density spectrum estimator 20 which serves to carry out Fast Fourier Transform conversion thereof from the time to the frequency domain. A "frame" used herein denotes a part of the audio signal which corresponds to a fixed number of audio samples and is a processing unit for the encoding and decoding of the audio signal.

Figure 2:
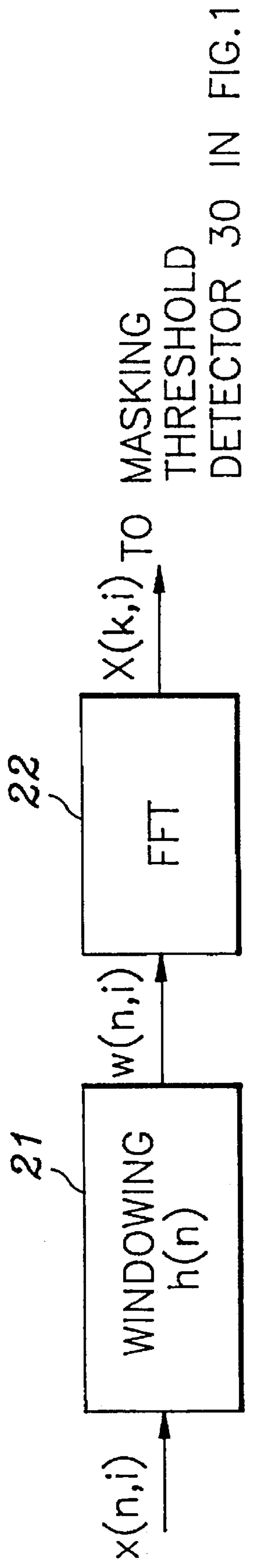
FIG. 2 illustrates a detailed block diagram depicting the power density spectrum estimator shown in FIG. 1.

Turning now to FIG. 2, the first power density spectrum estimator 20 includes a windowing block 21 and a Fast Fourier Transform (FFT) block 22.

The windowing block 21 receives the input digital audio signal x(n,i); and performs the windowing process by multiplying the input digital audio signal with a predetermined hanning window. The predetermined hanning window h(n) may be represented as:

$$h(n) = 0.5\sqrt{8/3}\ \{1-\cos(2\pi n/N)\} \qquad \text{Eq. (1)}$$

wherein N is a positive integer and n=0, 1, 2, . . . , N−1

Accordingly, the output w(n,i) from the windowing block 21 may be represented as:

$$w(n,i)=x(n,i)\cdot h(n) \qquad \text{Eq. (2)}$$

wherein i is an frame index and n is the same as previously defined.

The output w(n,i) from the windowing block 21 is then provided to the FFT block 22 which serves to estimate the power density spectrum thereof; and, in a preferred embodiment of the present invention, includes a 512 point FFT for Psychoacoustic Model I[or MPEG (moving pictures expert group)—Audio Layer I]. Accordingly, the power density spectrum X(k,i) of the input digital audio signal, as is well known in the art, is calculated as follows:

$$X(k,i) = 10\log_{10}\left|\frac{1}{N}\sum_{n=0}^{N-1} w(n,i)\cdot e^{-j\omega}\right|^2 dB \qquad \text{Eq. (3)}$$

wherein ω is 2πkn/N, k=0, 1, . . . , (N/2)−1, N and n have the same meanings as previously defined.

Referring back to FIG. 1, the power density spectrum of the input digital audio signal, X(k,i), calculated at the FFT block 22 is then provided to the frequency masking threshold estimator 30 which is adapted to estimate a masking threshold depending on the power density spectrum of the input digital audio signal, and also provided to the weight factor calculator 60 which will be fully described hereinafter. At the frequency masking threshold estimator 30, the frequency masking threshold M(k,i) is determined through the use of the conventional frequency masking determination technique and then provided to the perceptual spectrum distance estimator 50.

In the meanwhile, an output digital audio signal y(n,i) of the ith frame from the audio system is applied to the subtractor 10 which serves to generate an difference signal e(n,i) representative of the difference between the input and the output audio signals for the ith frame, x(n,i) and y(n,i), which may be represented as:

$$e(n,i)=x(n,i)-y(n,i) \qquad \text{Eq. (4)}$$

wherein both of x(n,i) and y(n,i) are P, e.g., 16 bit pulse code modulation (PCM) audio signals.

Subsequently, the difference signal is provided to the second power density spectrum estimator 40 which is substantially identical to the first power density spectrum estimator 20 except that the power density spectrum E(k,i) of the difference signal is calculated therein. Accordingly, the second power density spectrum estimator 40 also includes a windowing block and a FFT block. Therefore, it should be appreciated that the power density spectrum of the difference signal, E(k,i), can be obtained by windowing the difference signal e(n,i) with the banning window h(n) as is done for the input digital audio signal x(n,i) in Eq. (2). Said power density spectrum E(k,i) for the ith frame may be obtained as:

$$E(k,i) = 10\log_{10}\left|\frac{1}{N}\sum_{n=0}^{N-1} w(n,i)\cdot e^{-j\omega}\right|^2 dB \qquad \text{Eq. (5)}$$

wherein ω, N, n, k, and i have the same meanings as previously defined.

The power density spectrum E(k,i) and the frequency masking threshold M(k,i) are simultaneously provided to the perceptual spectrum distance estimator 50 which serves to estimate a perceptual spectrum distance PSD(i) for the ith frame representative of the audio distortion for the ith frame. That is, the estimator 50 compares the power density spectrum of the difference signal E(k,i) with the masking threshold M(k,i), generates and provides to the multiplier 80 a perceptual spectrum distance representative of the audio distortion as perceived by the human auditory faculty by considering only the frequency masking effect. The PSD(i) may be represented as:

$$PSD(i) = \frac{1}{N/2}\sum_{k=0}^{(N/2)-1} \mathrm{MAX}[0,(E(k,i)-M(k,i))] \qquad \text{Eq. (6)}$$

wherein k and i are the same as previously defined; and i is a positive integer used as the frame index.

As can be seen from Eq. (6), the audio distortion for the ith frame is estimated by the power density spectrum of the difference signal which exceeds the frequency masking threshold.

The weight factor calculator 60 of the present invention calculates a weight factor W(i) of the ith frame based on the power density spectrums X(k,i) and X(k,i−1) of the ith (or current) and (i−1)st (or previous) frames.

Specifically, the weight factor calculator 60 detects and stores in a memory (not shown) thereof a maximum power density level MP(i) of the power density spectrum X(k,i) for the ith frame.

Subsequently, the weight factor calculator 60 reads from the memory, the maximum power density levels MP(i) for the current, i.e., ith frame and MP(i−1) for its previous, i.e., (i−1)st frame, which have been detected and stored in the memory in the same manner as described above in connection with MP(i), and calculates the weight factor W(i). In accordance with the preferred embodiment of the present invention, the weight factor W(i) may be obtained as follows:

$$W(i) = \begin{cases} \mathrm{Min}[1, MP(i)/MP(i-1)] & ; MP(i-1) > 0 \\ 1 & ; MP(i-1) = 0 \end{cases} \quad \text{Eq. (7)}$$

As can be seen from Eq. (7), the weight factor W(i) for the ith frame is 1 if the maximum power density level MP(i) of the (i−1)st frame is 0 or the maximum power density level for the ith frame MP(i) is not smaller than the maximum power density level MP(i−1) for the (i−1)st frame; and, otherwise, W(i) has a value ranging from 0 to 1 depending on the ratio MP(i)/MP(i−1).

The weight factor W(i) from the weight factor calculator 60 is then provided to the delay circuit 70 which delays W(i) for a predetermined time period to thereby provide a delayed weight factor DW(i) synchronized with the perceptual spectrum distance PSD(i). The delay circuit 70 can be easily implemented by employing general electronic circuitries well known in the art. The delayed weight factor DW(i) and the perceptual spectrum distance PSD(i) for the ith frame are simultaneously fed to a multiplier 80 which calculates an audio distortion WPSD(i) for the ith frame as follows:

$$WPSD(i) = PSD(i) \times DW(i) \quad \text{Eq. (8)}$$

As a result, as can be shown from Eq. (8), the audio distortion WPSD(i) can be advantageously obtained by multiplying the perceptual spectrum distance PSD(i) obtained by applying the frequency masking effect with the delayed weight factor DW(i) obtained by applying the time masking effect in accordance with the invention; and, therefore, the present invention yields a distortion measurement that is truly consistent with human auditory perception.

The audio distortion provided from the multiplier 80 may be transmitted to a display device, e.g., a monitor or a liquid crystal display, for its visual display for the user.

Although the weight factor is determined based on the maximum power density levels of the current and its previous frames, i.e., ith and (i−1)st frames, in the preferred embodiment of the present invention, it should be noted that the weight factor for the current frame may be calculated from the maximum power density levels of the current frame and its more than one previous frames.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for use in an audio system for evaluating an audio distortion, on a frame-by-frame basis, arising between an input digital audio signal to the audio system and an output digital audio signal from the audio system wherein said input and output digital audio signals include a plurality of frames, respectively, which comprises:

first estimation means for estimating a power density spectrum for a current frame of the input digital audio signal;

means for determining a frequency masking threshold based on the power density spectrum for the current frame of the input digital audio signal;

second estimation means for estimating a power density spectrum of a difference signal representing the difference between the current frame of the input digital audio signal and its corresponding frame of the output digital audio signal;

third estimation means for estimating a perceptual spectrum distance based on the power density spectrum of the difference signal and the frequency masking threshold; and fourth estimation means for estimating the audio distortion between the current frame of the input digital audio signal and its corresponding frame of the output digital audio signal by multiplying the estimated perceptual spectrum distance with a weight factor calculated by using the power density spectrums of the current frame and its at least one previous frame of the input digital audio signal.

2. The apparatus as recited in claim 1, wherein each of the frames has N audio samples and the perceptual spectrum distance (PSD) is calculated as:

$$PSD = \frac{1}{N/2} \sum_{k=0}^{(N/2)-1} \mathrm{MAX}[0,(E(k) - M(k)]$$

wherein k=0, 1, . . . , (N/2)−1 with N being a positive integer, E(k) is the power density spectrum of the difference signal, and M(k) is the frequency masking threshold.

3. The apparatus as recited in claim 2, wherein the first and the second estimation means include means for windowing the input digital audio signal and the difference signal.

4. The apparatus as recited in claim 3, wherein the power density spectrum for the current frame of the input digital audio signal, X(k), is determined as:

$$X(k) = 10 \log_{10} \left| \frac{1}{N} \sum_{n=0}^{N-1} w(n) \cdot e^{-j\omega} \right|^2 dB$$

wherein w(n)=x(n)·h(n), h(n) is a hanning window for the windowing means, ω is 2πkn/N, k=0,1,2, . . . , (N/2)−1 and n=0,1,2, . . . , N−1.

5. The apparatus as recited in claim 4, wherein the hanning window for the windowing means, h(n), is represented as:

$$h(n) = 0.5\sqrt{8/3}\ \{1 - \cos(2\pi n/N)\}$$

6. The apparatus as recited in claim 5, wherein the fourth estimation means includes:

weight factor calculation means for calculating the weight factor based on a maximum power density level of each of the power density spectrums of the current frame and its at least one previous frame of the input digital audio signal;

delay means for delaying the weight factor for a predetermined time period to thereby generate a delayed weight factor synchronized with the perceptual spectrum distance; and means for multiplying the perceptual spectrum distance with the delayed weight factor.

7. The apparatus as recited in claim 6, wherein the weight factor for the current frame, W(i), is determined as:

$$W(i) = \mathrm{Min}[1, MP(i)/MP(i-1)]; \quad MP(i-1) > 0$$
$$= 1; \quad MP(i-1) = 0$$

wherein i is an index denoting the current frame; (i−1), an index denoting the previous frame; MP(i), the maximum power density level of the current frame of the input digital audio signal; and MP(i−1), the maximum power density level of the previous frame of the input digital audio signal.

8. A method for use in an audio system for evaluating an audio distortion, on a frame-by-frame basis, arising between an input digital audio signal to the audio system and an output digital audio signal from the audio system wherein said input and output digital audio signals include a plurality of frames, respectively, comprising the steps of:

estimating a power density spectrum for a current frame of the input digital audio signal;

determining a frequency masking threshold based on the power density spectrum for the current frame of the input digital audio signal;

estimating a power density spectrum of a difference signal representing the difference between the current frame of the input digital audio signal and its corresponding frame of the output digital audio signal;

estimating a perceptual spectrum distance based on the power density spectrum of the difference signal and the frequency masking threshold; and estimating the audio distortion between the current frame of the input digital audio signal and its corresponding frame of the output digital audio signal by multiplying the estimated perceptual spectrum distance with a weight factor calculated by using the power density spectrums of the current frame and its at least one previous frame of the input digital audio signal.

9. The method as recited in claim 8, wherein each of the frames has N audio samples and the perceptual spectrum distance (PSD) is calculated as:

$$PSD = \frac{1}{N/2} \sum_{k=0}^{(N/2)-1} \mathrm{MAX}[0,(E(k) - M(k))]$$

wherein k=0, 1, . . . , (N/2)−1 with N being a positive integer, E(k) is the power density spectrum of the difference signal, and M(k) is the frequency masking threshold.

10. The method as recited in claim 9, wherein both of the steps of estimating the power density spectrums of the input digital audio signal and the difference signal include steps for windowing the input digital audio signal and the difference signal, respectively.

11. The method as recited in claim 10, wherein the power density spectrum for the current frame of the input digital audio signal, X(k), is determined as:

$$X(k) = 10 \log_{10} \left| \frac{1}{N} \sum_{n=0}^{N-1} w(n) \cdot e^{-j\omega} \right|^2 \mathrm{dB}$$

wherein w(n)=x(n)·h(n), h(n) is a banning window, ω is 2πkn/N, k=0,1,2, . . . , (N/2)−1 and n=0,1,2, . . . , N−1.

12. The method as recited in claim 10, wherein the hanning window, h(n), is represented as:

$$h(n) = 0.5\sqrt{8/3}\ \{1 - \cos(2\pi n/N)\}$$

13. The method as recited in claim 12, wherein the step of estimating the audio distortion of the current frame includes the steps of:

calculating the weight factor based on a maximum power density level of each of the power density spectrums of the current frame and its at least one previous frame of the input digital audio signal;

delaying the weight factor for a predetermined time period to thereby generate a delayed weight factor synchronized with the perceptual spectrum distance; and multiplying the perceptual spectrum distance with the delayed weight factor.

14. The method as recited in claim 13, wherein the weight factor for the current frame, W(i), is determined as:

$$W(i) = \mathrm{Min}[1, MP(i)/MP(i-1)]; \quad MP(i-1) > 0$$
$$= 1; \quad MP(i-1) = 0$$

wherein i is an index denoting the current frame; (i−1), an index of the previous frame; MP(i), the maximum power density level of the current frame of the input digital audio signal; and MP(i−1), the maximum power density level of the previous frame of the input digital audio signal.

* * * * *